July 25, 1939.　　A. B. GARDELLA　　2,167,579
FLAGSTAFF STRUCTURE
Filed June 8, 1938

INVENTOR
ALBERT B. GARDELLA
BY
Hyde, Higley & Meyer
ATTORNEYS

Patented July 25, 1939

2,167,579

UNITED STATES PATENT OFFICE 2,167,579

FLAGSTAFF STRUCTURE

Albert B. Gardella, Cleveland, Ohio, assignor of one-half to George C. Guckes, Lakewood, Ohio Application June 8, 1938, Serial No. 212,422

4 Claims. (Cl. 116—173)

This invention relates to improvements in flagstaff structures and more particularly, in flagstaff structures of the type adapted to be releasably clamped or secured in an upright position to a suitable support, such as one of the bumper bars or the like of an automobile, for example.

The present invention has for its general object the provision of a flagstaff structure which is simple and inexpensive in construction so that it can be made and sold at low cost; which is neat and attractive in appearance; which can be releasably clamped to an automobile bumper bar or other support in a simple and convenient manner; and which is of such character that a flag or the like can be easily and quickly secured thereto and removed therefrom, the method of securement of said flag or the like being such that there is no liability of its accidental escape.

Figure 1:
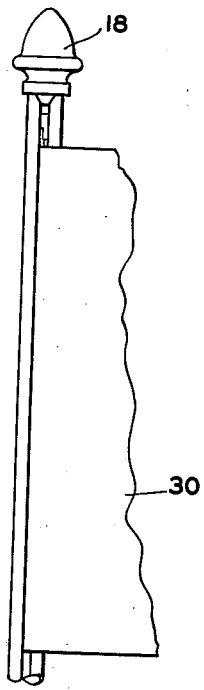
Figure 2:
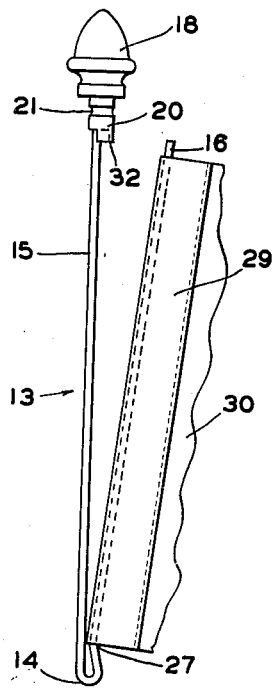
Figure 7:
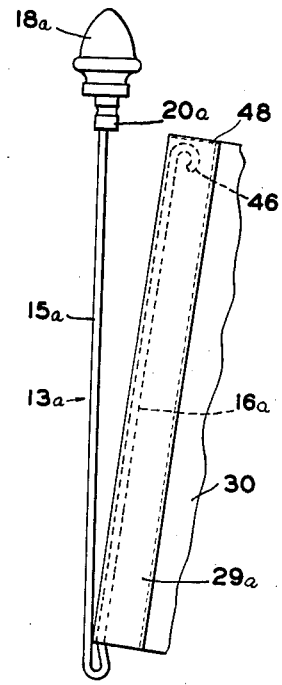
Figure 4:
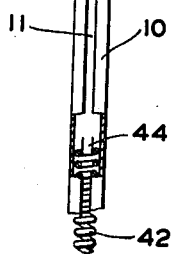
Figure 4:
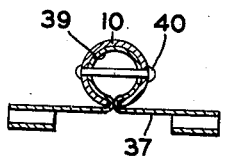
Figure 6:
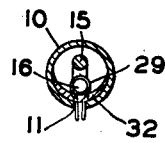
Figure 5:
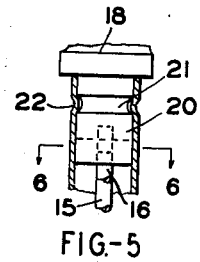
Figure 3:
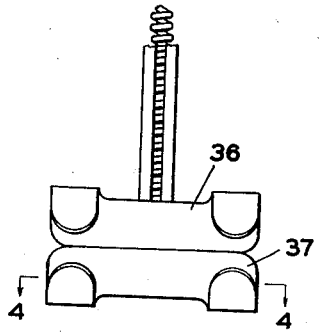
Figure 3:
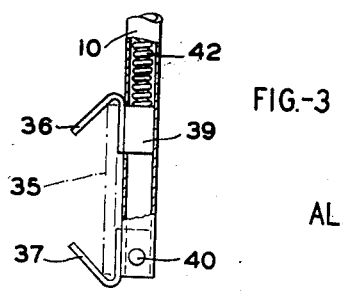

Further objects of the present invention are in part obvious and in part will appear from the following description of two embodiments thereof, reference being had to the accompanying drawing, in which Fig. 1 is a side elevation of a flagstaff structure embodying one form of the present invention, a portion of the tubular staff member of such structure being broken away and in section to illustrate interior parts and a flag or the like (fragmentarily shown) being secured thereto;

Fig. 2 is a side elevation of the flag-carrying member and the ornamental cap of said flagstaff structure, the flag-receiving leg of said flag-carrying member being in position to permit a flag or the like to be applied thereto and removed therefrom; Fig. 3 is a detail side view of the lower end portion of the flagstaff structure, as releasably clamped to an automobile bumper bar or other support, with portions of the tubular staff member broken away and in section; Fig. 4 is a detail cross-sectional view through the fixed clamping member and the tubular staff member, the view being on the line 4—4, Fig. 1; Fig. 5 is a detail side view of the upper end portion of the flagstaff structure, the tubular staff member thereof being in section, and the flag or the like being omitted; Fig. 6 is a cross-sectional view of the upper end portion of said flagstaff structure, the view being on the line 6—6, Fig. 5; and Fig. 7 is a view similar to Fig. 2 and showing a modified form of the present invention.

Before the present invention is described in detail, it is to be understood that such invention is not limited to the details of construction and/or the specific arrangement of parts herein illustrated and/or described, as the invention obviously may take other forms. It also is to be understood that the phraseology or terminology herein employed is for the purpose of description and not of limitation.

Referring first to that embodiment of the present invention illustrated in Figs. 1 to 6 inclusive, it will be noted that the flagstaff structure constituting such embodiment includes a tubular staff member 10 of any suitable material, such as light gauge sheet metal, said member being provided throughout its length with a relatively narrow slot 11. Adapted to be removably secured within the upper end portion of said tubular staff member is a flag-carrying member 13 in the form of a simple metal rod of flexible and resilient character, said rod being bent intermediate its ends, as at 14, into substantially U shape, the two rod legs thus provided, one slightly longer than the other, being designated by the reference numerals 15 and 16.

To enable said flag-carrying rod to be removably secured within the upper end portion of the tubular staff member 10, an ornamental cap 18 for the flagstaff structure is rigidly or otherwise suitably mounted on the free end portion of the longer leg 15 of said flag-carrying rod, the cross-dimensional size of said cap, which may be of metal or any other suitable material, being such that it is adapted to seat upon the upper end of said tubular staff member.

As best shown in Figs. 2 and 5, said ornamental cap 18 is provided with a depending neck portion 20 of reduced size and of generally cylindrical form, the diameter of said neck portion being such as to enable it to be inserted into the upper end portion of the tubular staff member 10, preferably with more or less of a press fit. Although such a press fit may be solely relied upon, if desired, to maintain such parts in assembled relationship, means is here provided for interlocking such parts, with the result that there is no liability of accidental and undesirable disassembly thereof. As here shown, the cap neck portion 20 is provided with an annular groove 21 for the reception of oppositely disposed and inwardly extending projections 22 with which the upper end portion of the tubular staff member 10 is provided, an economical method of forming said projections being to crimp them in the metal of said staff member.

By providing the connecting bend 14 for the legs 15 and 16 of the flag-carrying rod 13 with a simple crimp 27, the shorter leg 16 is given a normal tendency to extend at an angle from the leg 15, as indicated in Fig. 2. When said leg 16 is in such position, the hemmed and open ended edge portion 29 of a flag or the like 30 may be quickly and conveniently slid onto and off of such leg, as will be readily understood. In this embodiment of the present invention, means is provided for releasably securing the free end portion of such flag-receiving leg 16 in assembled relation with the cap neck portion 20, which normally lies within the upper end portion of the tubular staff member 10. For such purpose, the cap neck portion 20 has depending from one side thereof an arcuately shaped retaining shoulder or catch 32 for the free end portion of the leg 16, and the normal tendency of said leg to spring outwardly from the leg 15 is amply sufficient to releasably maintain the free end portion of the flag-receiving leg 16 back of and in engagement with such retaining shoulder or catch, whenever such leg end portion is moved to such position.

After a flag or the like 30 has been placed on the leg 16, and the free end portion of such leg positioned behind the retaining shoulder or catch 32 of the cap neck portion 20, the now generally parallel legs 15 and 16 and such cap neck portion may be inserted into the upper end portion of the tubular staff member 10, the flag or the like moving downwardly along such staff member in the longitudinal slot 11 thereof. As will be apparent from an examination of Fig. 6, the slot of said staff member is amply wide enough to receive such flag or the like but not of sufficient width to permit the leg 16 to pass therethrough. Although such flag or the like, the legs 15 and 16 and the ornamental cap 18 may be readily removed, whenever desired, from the tubular staff member 10, there is no liability of accidental escape of such parts from said staff member, due to the interlocking connection of the cap neck portion 20 with such staff member.

In order to enable the lower end portion of said staff member to be releasably clamped to an automobile bumper bar or other support 35 (see Fig. 3), with said staff member in an upright position, two clamping members 36 and 37 are here utilized. In this particular embodiment of the invention, the clamping members 36 and 37 are simple sheet metal members, with offset intermediate portions 39 of generally cylindrical shape positioned within the lower end portion of the tubular staff member 10, it being possible to endwise insert such offset intermediate portions of said clamping members into said staff member because of the longitudinal slot 11 with which such staff member is provided. As shown in Figs. 3 and 4, the lower clamping member 37 has its offset intermediate portion 39 pinned or otherwise rigidly secured, as at 40, to the staff member 10, but the upper clamping member 36 is free for sliding movement toward and from such fixed clamping member, the offset intermediate portion 39 of said movable clamping member moving within said tubular staff member.

For the production of the desired clamping effect, the upper and movable clamping member 36 is normally urged downwardly toward the lower and fixed clamping member 37, and for such purpose, a coiled compression spring 42 is positioned within the lower end portion of the tubular staff member 10, the lower end of said spring having bearing engagement with the offset intermediate portion 39 of said movable clamping member 36, as shown in Fig. 3. The upper end of said compression spring, as shown in Fig. 1, has bearing engagement with a suitable projection with which an intermediate portion of the staff member 10 is provided, such as the simple punched in projection 44 here shown.

It is not essential that the free end portion of the flag-receiving leg of the flag-carrying rod be maintained in assembly with the ornamental cap on the free end portion of the other leg of said rod, as the tubular staff member in which such rod is inserted in use of the present structure is sufficient to maintain the two legs of such rod in substantially parallel relationship when within said staff member. In the embodiment of the invention illustrated in Fig. 7, therefore, the reversely bent free end portion 46 of the rod leg 16a is not adapted to be secured in assembly with the ornamental cap 18a, and as a result, the generally cylindrical neck portion 20a of such cap is not provided with a retaining shoulder or catch, such as the retaining shoulder or catch 32 of the cap neck portion 20 heretofore described. When the flag-carrying rod 13a shown in Fig. 7 is inserted into the upper end portion of a tubular staff member, such as the staff member 10 shown in Figs. 1 to 6 inclusive, the legs 15a and 16a of such rod 13a will be maintained by said staff member in substantially parallel relationship, the length of the leg 16a being such that it terminates below the cap neck portion 20a.

Inasmuch as it is not necessary in the embodiment of the invention illustrated in Fig. 7 that the leg 16a project through the upper end of the hemmed edge portion 29a of the flag or the like 30a, said upper end of such hemmed edge portion 29a may be closed, if desired, such as by the stitching 48. As a result, the flag or the like 30a can not slide downwardly along the leg 16a, so that there is no liability of such flag or the like becoming "bunched up" or wrinkled, as will be readily understood.

Further features of the present invention will be readily apparent to those skilled in the art to which the invention relates.

What I claim is:

1. A flagstaff structure, comprising a tubular staff member having a longitudinally disposed slot for the extension therethrough of a flag or the like having a hemmed edge, a generally U-shaped flag-carrying member adapted to be inserted into said tubular staff member with the free end portions of the two legs of said flag-carrying member uppermost, and a cap member adapted to be removably mounted on the upper end portion of said tubular staff member and to have secured thereto the free end portion of one of the legs of the flag-carrying member, the other leg of said flag-carrying member being adapted to have removably sleeved thereon the hemmed edge of a flag or the like.

2. A flagstaff structure, comprising a tubular staff member having a longitudinally disposed slot for the extension therethrough of a flag or the like having a hemmed edge, a generally U-shaped flag-carrying member adapted to be inserted into said tubular staff member with the free end portions of the two legs of said flag-carrying member uppermost, and a cap member adapted to be removably mounted on the upper end portion of said tubular staff member and to have secured thereto the free end portions of the legs of said flag-carrying member, one of the legs of said flag-carrying member being adapted to have removably sleeved thereon the hemmed edge of a flag or the like and the securement of the free end portion of such leg to said cap member being of readily releasable character.

3. A flagstaff structure, comprising a tubular staff member having a longitudinally disposed slot for the extension therethrough of a flag or the like having a hemmed edge, a generally U-shaped flag-carrying member of resilient character and adapted to be inserted into said tubular staff member with the free end portions of the two resilient legs of said flag-carrying member uppermost, and a cap member adapted to be releasably interlocked with the upper end portion of said tubular staff member and to have secured thereto the free end portion of one of the legs of said flag-carrying member, the other leg of said flag-carrying member being adapted to have removably sleeved thereon the hemmed edge of a flag or the like.

4. A flagstaff structure, comprising a tubular staff member having a longitudinally disposed slot for the extension therethrough of a flag or the like having a hemmed edge, a generally U-shaped flag-carrying member of resilient character adapted to be inserted into said tubular staff member with the free end portions of the two legs of said flag-carrying member uppermost, and a cap member for the upper end portion of said tubular staff member and having a neck portion adapted to be removably inserted thereinto, the free end portion of one of the legs of said flag-carrying member being secured to said cap member and the neck portion of such cap member having a catch shoulder for the releasable retention of the free end portion of the other leg of said flag-carrying member, said last mentioned leg being adapted to have removably sleeved thereon the hemmed edge of a flag or the like.

ALBERT B. GARDELLA.